United States Patent
Lafarge et al.

(10) Patent No.: US 8,038,410 B2
(45) Date of Patent: Oct. 18, 2011

(54) OPTIMIZED AERODYNAMIC AIRFOIL FOR A TURBINE BLADE

(75) Inventors: Gregory Pierre Lafarge, Choisy en Brie (FR); Philippe Picot, Le Chatelet en Brie (FR); Christophe Bernard Texier, Rampillon (FR)

(73) Assignee: SNECMA, Paris (FR)

( * ) Notice: Subject to any disclaimer, the term of this patent is extended or adjusted under 35 U.S.C. 154(b) by 910 days.

(21) Appl. No.: 12/035,136

(22) Filed: Feb. 21, 2008

(65) Prior Publication Data

US 2008/0206061 A1    Aug. 28, 2008

(30) Foreign Application Priority Data

Feb. 22, 2007   (FR) ...................... 07 01260

(51) Int. Cl.
  *F01D 5/14*    (2006.01)
(52) U.S. Cl. .................... 416/243; 415/191; 416/223 A; 416/DIG. 2
(58) Field of Classification Search ................ 415/191; 416/223 R, 223 A, 223 B, 243, DIG. 2, DIG. 5
See application file for complete search history.

(56) References Cited

U.S. PATENT DOCUMENTS

| | | | |
|---|---|---|---|
| 6,503,054 B1 * | 1/2003 | Bielek et al. | 415/191 |
| 6,722,853 B1 * | 4/2004 | Humanchuk et al. | 416/223 A |
| 6,736,599 B1 | 5/2004 | Jacks et al. | |
| 6,739,838 B1 * | 5/2004 | Bielek et al. | 416/223 A |
| 7,094,034 B2 * | 8/2006 | Fukuda et al. | 416/223 A |
| 7,367,779 B2 * | 5/2008 | Girgis et al. | 416/223 A |
| 7,467,920 B2 * | 12/2008 | Sullivan et al. | 415/193 |
| 2007/0248465 A1 | 10/2007 | Botrel et al. | |

FOREIGN PATENT DOCUMENTS

EP    1 621 729 A2    2/2006

* cited by examiner

*Primary Examiner* — Edward Look
*Assistant Examiner* — Jason Davis
(74) *Attorney, Agent, or Firm* — Oblon, Spivak, McClelland, Maier & Neustadt, L.L.P.

(57) ABSTRACT

When cold and in the uncoated state, the aerodynamic airfoil is substantially identical to a nominal airfoil determined by the Cartesian coordinates X, Y, Z' given in Table 1, in which the coordinate Z' is the ratio D/H where D is the distance from the point in question to a reference plane P0, located at the base of the nominal airfoil, and H is the height of this airfoil, measured from said reference plane up to the tip of the blade. The D and H measurements being taken radially with respect to the axis of the turbine whereas the X coordinate is measured in the axial direction of the turbine.

7 Claims, 1 Drawing Sheet

OPTIMIZED AERODYNAMIC AIRFOIL FOR A TURBINE BLADE

BACKGROUND OF THE INVENTION

The present invention relates to an aerodynamic airfoil for a turbine blade.

In particular, the invention relates to the aerodynamic airfoil for a fixed guide blade of a gas turbine and more particularly a high-pressure turbine of the type used in an aircraft turbomachine.

Such an airfoil must ensure that the turbine has the desired efficiency, and to do this it must be such that the airflow around this airfoil is sound, that is to say such that it causes substantially no turbulence deleterious to the overall efficiency. In addition, it must withstand high mechanical stresses and allow these to be distributed within the blade so as to prevent it from wearing prematurely. In other words, the aerodynamic airfoil must allow the aerodynamic and mechanical performance of the blade to be optimized.

Moreover, the airfoil must be able to be correctly fitted into the inner and outer platforms of a complete blade and be able to be manufactured without undue difficulty. In particular, for turbomachine application, the airfoil must allow the fitting of a cooling circuit so as to ensure thermal integrity of the blade, that is to say to avoid hot spots, in the operating range of the turbojet.

SUMMARY OF THE INVENTION

The object of the invention is to provide an optimized aerodynamic airfoil for a turbine blade, capable of meeting these objectives.

This object is achieved thanks to the fact that, when cold and in the uncoated state, said airfoil is substantially identical to a nominal airfoil determined by the Cartesian coordinates X, Y, Z' given in Table 1, in which the coordinate Z' is the ratio D/H where D is the distance from the point in question to a reference plane X,Y, located at the base of the nominal airfoil, and H is the height of this airfoil, measured from said reference plane up to the tip of the blade, the D and H measurements being taken radially with respect to the axis of the turbine whereas the X coordinate is measured in the axial direction of the turbine.

This airfoil has been determined after numerous trials and simulations. It is defined when cold, that is to say at an ambient temperature of 20° C. This is a reference temperature with respect to which the airfoil is geometrically determined. The abovementioned aerodynamic and mechanical optimization objectives are of course valid for the operating conditions of this aerodynamic airfoil, that is to say when it is hot, at a steady-state temperature under cruise operating conditions of the turbomachine, of which the turbine forms part.

Moreover, the aerodynamic airfoil according to the invention is defined in the uncoated state. Since the turbine blades have to be exposed to high temperature gradients, they are frequently provided with a coating having thermal properties allowing them to withstand these temperature variations more easily. This airfoil is determined before such a coating is applied.

It was mentioned above that the airfoil of the invention is "substantially identical" to the nominal airfoil. This means that the airfoil may vary very slightly from this nominal airfoil.

The aerodynamic airfoil is thus preferably defined within an envelope of ±1 mm in a direction normal to the surface of the nominal airfoil.

This variation takes account, in particular, of the manufacturing tolerances of the airfoil.

It is also preferable for the X, Y coordinates of the aerodynamic airfoil to lie within the ±5% range with respect to the X,Y coordinates of the nominal airfoil.

This variation takes into account the setting of the airfoil in order to adapt it to the flow coming from the upstream side, so as to further improve the efficiency of the turbine.

BRIEF DESCRIPTION OF THE DRAWINGS

The invention will be clearly understood and its advantages will become more apparent on reading the following detailed description of one embodiment given by way of example. The description refers to the appended drawings in which.

DESCRIPTION OF THE PREFERRED EMBODIMENTS

Figure 1:
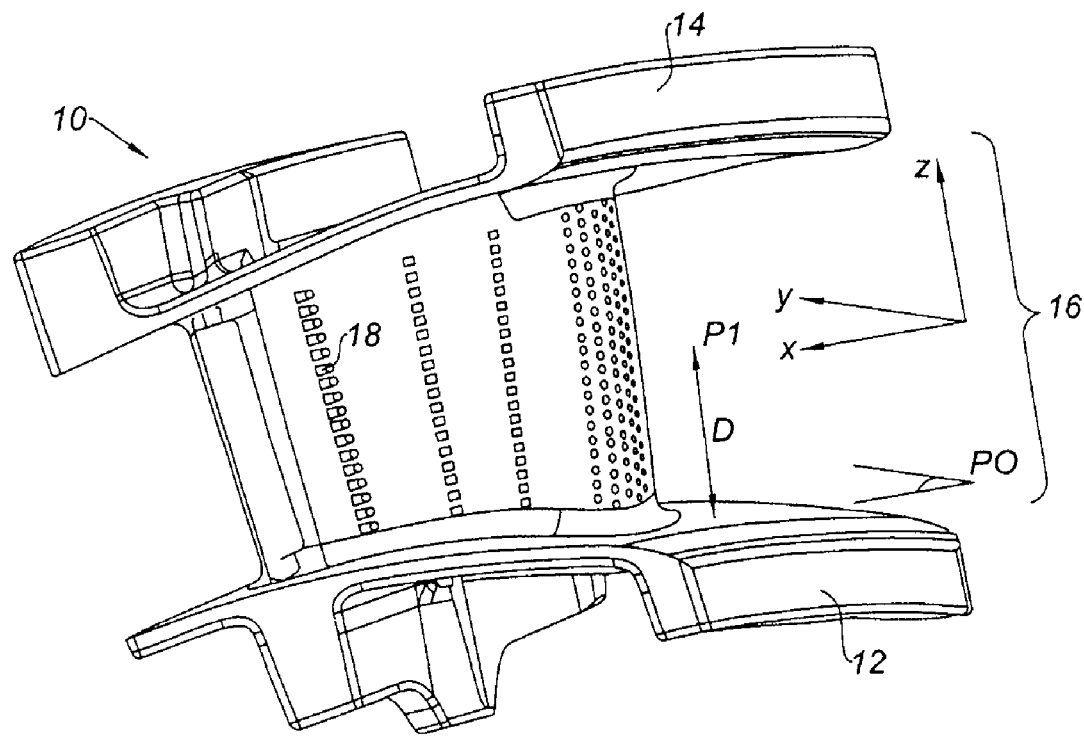
FIG. 1 is a perspective view of a fixed guide blade for a turbine to which the invention applies, the airfoil of the blade being shown between the platforms of the blade.

The blade 10 shown in FIG. 1 comprises an inner platform 12 and an outer platform 14 between which an aerodynamic airfoil 16 extends. By convention the aerodynamic airfoil is the entire part of the blade that extends radially from the inner platform 12 to the outer platform 14 of the blade 10.

In FIG. 1, the reference frame of Cartesian coordinates X, Y, Z is indicated. The radial direction Z is that of the height of the blade, which extends radially from the inner platform 12 to the outer platform 14 of the blade 10. This direction Z is perpendicular to the axial direction X, which is that of the geometric axis of the turbomachine in which the blade is intended to be fitted. The Y direction is perpendicular to the X,Z plane.

The X direction is that of the axis of revolution of the turbine, which axis also corresponds to the axis of rotation of the turbomachine, whereas the Y direction is the direction perpendicular to the axis of revolution of the turbine, the Z direction being radial.

It may be seen that the blade 10 is provided with openings 18 passing through its wall from the inside to the outside of the blade 10, which may be hollow so as to allow it to be cooled by air circulation.

The nominal airfoil from which the aerodynamic airfoil of the invention is determined is defined in the table of coordinates given below, in which the Z' coordinate, along the Z axis, is dimensionless and therefore varies between 0 and 1, whereas the X and Y dimensions, taken along the X and Y axes respectively, are expressed in millimeters.

TABLE 1

| X | Y | Z' |
|---|---|---|
| −14.953 | −4.082 | 0.000 |
| −14.959 | −4.205 | 0.000 |
| −14.961 | −4.384 | 0.000 |
| −14.950 | −4.661 | 0.000 |
| −14.906 | −5.044 | 0.000 |
| −14.807 | −5.538 | 0.000 |
| −14.639 | −6.143 | 0.000 |
| −14.385 | −6.858 | 0.000 |
| −14.028 | −7.676 | 0.000 |
| −13.551 | −8.585 | 0.000 |
| −12.937 | −9.570 | 0.000 |
| −12.170 | −10.612 | 0.000 |
| −11.231 | −11.681 | 0.000 |

TABLE 1-continued

| X | Y | Z' |
|---|---|---|
| −10.100 | −12.737 | 0.000 |
| −8.749 | −13.712 | 0.000 |
| −7.167 | −14.518 | 0.000 |
| −5.360 | −15.025 | 0.000 |
| −3.390 | −15.022 | 0.000 |
| −1.423 | −14.430 | 0.000 |
| 0.384 | −13.303 | 0.000 |
| 1.950 | −11.764 | 0.000 |
| 3.307 | −9.975 | 0.000 |
| 4.506 | −8.028 | 0.000 |
| 5.572 | −5.976 | 0.000 |
| 6.547 | −3.865 | 0.000 |
| 7.461 | −1.726 | 0.000 |
| 8.337 | 0.416 | 0.000 |
| 9.188 | 2.541 | 0.000 |
| 10.028 | 4.631 | 0.000 |
| 10.853 | 6.672 | 0.000 |
| 11.667 | 8.652 | 0.000 |
| 12.460 | 10.561 | 0.000 |
| 13.221 | 12.394 | 0.000 |
| 13.943 | 14.142 | 0.000 |
| 14.614 | 15.801 | 0.000 |
| 15.237 | 17.360 | 0.000 |
| 15.810 | 18.813 | 0.000 |
| 16.332 | 20.154 | 0.000 |
| 16.803 | 21.378 | 0.000 |
| 17.223 | 22.481 | 0.000 |
| 17.592 | 23.462 | 0.000 |
| 17.911 | 24.320 | 0.000 |
| 18.182 | 25.056 | 0.000 |
| 18.407 | 25.672 | 0.000 |
| 18.589 | 26.174 | 0.000 |
| 18.731 | 26.568 | 0.000 |
| 18.834 | 26.863 | 0.000 |
| 18.836 | 27.078 | 0.000 |
| 18.761 | 27.193 | 0.000 |
| 18.676 | 27.254 | 0.000 |
| 18.606 | 27.280 | 0.000 |
| 18.509 | 27.288 | 0.000 |
| 18.367 | 27.236 | 0.000 |
| 18.233 | 27.061 | 0.000 |
| 18.085 | 26.805 | 0.000 |
| 17.895 | 26.479 | 0.000 |
| 17.660 | 26.079 | 0.000 |
| 17.375 | 25.604 | 0.000 |
| 17.036 | 25.053 | 0.000 |
| 16.641 | 24.427 | 0.000 |
| 16.188 | 23.727 | 0.000 |
| 15.673 | 22.956 | 0.000 |
| 15.092 | 22.122 | 0.000 |
| 14.443 | 21.229 | 0.000 |
| 13.728 | 20.282 | 0.000 |
| 12.945 | 19.289 | 0.000 |
| 12.096 | 18.257 | 0.000 |
| 11.181 | 17.195 | 0.000 |
| 10.199 | 16.112 | 0.000 |
| 9.155 | 15.018 | 0.000 |
| 8.052 | 13.921 | 0.000 |
| 6.893 | 12.830 | 0.000 |
| 5.686 | 11.754 | 0.000 |
| 4.436 | 10.699 | 0.000 |
| 3.153 | 9.672 | 0.000 |
| 1.844 | 8.678 | 0.000 |
| 0.517 | 7.725 | 0.000 |
| −0.818 | 6.814 | 0.000 |
| −2.150 | 5.948 | 0.000 |
| −3.471 | 5.133 | 0.000 |
| −4.773 | 4.371 | 0.000 |
| −6.044 | 3.662 | 0.000 |
| −7.282 | 3.014 | 0.000 |
| −8.466 | 2.409 | 0.000 |
| −9.586 | 1.840 | 0.000 |
| −10.626 | 1.288 | 0.000 |
| −11.569 | 0.733 | 0.000 |
| −12.392 | 0.156 | 0.000 |
| −13.086 | −0.440 | 0.000 |
| −13.648 | −1.037 | 0.000 |
| −14.088 | −1.614 | 0.000 |
| −14.414 | −2.153 | 0.000 |
| −14.638 | −2.640 | 0.000 |
| −14.780 | −3.061 | 0.000 |
| −14.865 | −3.406 | 0.000 |
| −14.912 | −3.675 | 0.000 |
| −14.937 | −3.869 | 0.000 |
| −14.948 | −3.995 | 0.000 |
| −15.074 | −4.331 | 0.036 |
| −15.081 | −4.456 | 0.036 |
| −15.084 | −4.636 | 0.036 |
| −15.075 | −4.915 | 0.036 |
| −15.034 | −5.302 | 0.036 |
| −14.935 | −5.800 | 0.036 |
| −14.763 | −6.410 | 0.036 |
| −14.503 | −7.130 | 0.036 |
| −14.137 | −7.952 | 0.036 |
| −13.650 | −8.866 | 0.036 |
| −13.023 | −9.855 | 0.036 |
| −12.239 | −10.898 | 0.036 |
| −11.280 | −11.965 | 0.036 |
| −10.122 | −13.012 | 0.036 |
| −8.741 | −13.968 | 0.036 |
| −7.126 | −14.742 | 0.036 |
| −5.290 | −15.205 | 0.036 |
| −3.303 | −15.150 | 0.036 |
| −1.331 | −14.517 | 0.036 |
| 0.479 | −13.359 | 0.036 |
| 2.048 | −11.797 | 0.036 |
| 3.408 | −9.985 | 0.036 |
| 4.606 | −8.015 | 0.036 |
| 5.666 | −5.937 | 0.036 |
| 6.630 | −3.799 | 0.036 |
| 7.529 | −1.631 | 0.036 |
| 8.386 | 0.540 | 0.036 |
| 9.215 | 2.695 | 0.036 |
| 10.031 | 4.814 | 0.036 |
| 10.832 | 6.886 | 0.036 |
| 11.621 | 8.895 | 0.036 |
| 12.390 | 10.834 | 0.036 |
| 13.128 | 12.695 | 0.036 |
| 13.828 | 14.469 | 0.036 |
| 14.478 | 16.153 | 0.036 |
| 15.081 | 17.735 | 0.036 |
| 15.636 | 19.210 | 0.036 |
| 16.141 | 20.570 | 0.036 |
| 16.597 | 21.812 | 0.036 |
| 17.002 | 22.932 | 0.036 |
| 17.358 | 23.927 | 0.036 |
| 17.666 | 24.797 | 0.036 |
| 17.927 | 25.544 | 0.036 |
| 18.144 | 26.170 | 0.036 |
| 18.319 | 26.679 | 0.036 |
| 18.455 | 27.079 | 0.036 |
| 18.554 | 27.378 | 0.036 |
| 18.554 | 27.595 | 0.036 |
| 18.477 | 27.709 | 0.036 |
| 18.390 | 27.770 | 0.036 |
| 18.319 | 27.795 | 0.036 |
| 18.222 | 27.801 | 0.036 |
| 18.080 | 27.745 | 0.036 |
| 17.949 | 27.566 | 0.036 |
| 17.804 | 27.306 | 0.036 |
| 17.618 | 26.974 | 0.036 |
| 17.388 | 26.567 | 0.036 |
| 17.108 | 26.084 | 0.036 |
| 16.776 | 25.523 | 0.036 |
| 16.389 | 24.886 | 0.036 |
| 15.943 | 24.174 | 0.036 |
| 15.436 | 23.390 | 0.036 |
| 14.864 | 22.540 | 0.036 |
| 14.225 | 21.630 | 0.036 |
| 13.518 | 20.666 | 0.036 |
| 12.746 | 19.653 | 0.036 |
| 11.906 | 18.600 | 0.036 |
| 11.000 | 17.516 | 0.036 |
| 10.029 | 16.410 | 0.036 |
| 8.995 | 15.290 | 0.036 |
| 7.902 | 14.166 | 0.036 |

TABLE 1-continued

| X | Y | Z' |
|---|---|---|
| 6.755 | 13.047 | 0.036 |
| 5.560 | 11.939 | 0.036 |
| 4.323 | 10.851 | 0.036 |
| 3.053 | 9.788 | 0.036 |
| 1.757 | 8.757 | 0.036 |
| 0.444 | 7.764 | 0.036 |
| -0.877 | 6.813 | 0.036 |
| -2.196 | 5.906 | 0.036 |
| -3.504 | 5.049 | 0.036 |
| -4.795 | 4.247 | 0.036 |
| -6.057 | 3.498 | 0.036 |
| -7.286 | 2.814 | 0.036 |
| -8.466 | 2.180 | 0.036 |
| -9.584 | 1.585 | 0.036 |
| -10.625 | 1.016 | 0.036 |
| -11.573 | 0.454 | 0.036 |
| -12.407 | -0.120 | 0.036 |
| -13.116 | -0.708 | 0.036 |
| -13.699 | -1.295 | 0.036 |
| -14.159 | -1.863 | 0.036 |
| -14.501 | -2.398 | 0.036 |
| -14.736 | -2.884 | 0.036 |
| -14.887 | -3.305 | 0.036 |
| -14.977 | -3.652 | 0.036 |
| -15.028 | -3.921 | 0.036 |
| -15.055 | -4.117 | 0.036 |
| -15.068 | -4.244 | 0.036 |
| -15.463 | -5.123 | 0.151 |
| -15.473 | -5.250 | 0.151 |
| -15.482 | -5.436 | 0.151 |
| -15.479 | -5.723 | 0.151 |
| -15.444 | -6.122 | 0.151 |
| -15.345 | -6.635 | 0.151 |
| -15.160 | -7.260 | 0.151 |
| -14.879 | -7.995 | 0.151 |
| -14.486 | -8.834 | 0.151 |
| -13.965 | -9.763 | 0.151 |
| -13.295 | -10.765 | 0.151 |
| -12.457 | -11.813 | 0.151 |
| -11.429 | -12.874 | 0.151 |
| -10.187 | -13.892 | 0.151 |
| -8.708 | -14.786 | 0.151 |
| -6.992 | -15.455 | 0.151 |
| -5.069 | -15.771 | 0.151 |
| -3.036 | -15.556 | 0.151 |
| -1.043 | -14.795 | 0.151 |
| 0.778 | -13.541 | 0.151 |
| 2.363 | -11.904 | 0.151 |
| 3.734 | -10.018 | 0.151 |
| 4.929 | -7.969 | 0.151 |
| 5.971 | -5.807 | 0.151 |
| 6.900 | -3.580 | 0.151 |
| 7.750 | -1.320 | 0.151 |
| 8.546 | 0.946 | 0.151 |
| 9.303 | 3.198 | 0.151 |
| 10.043 | 5.414 | 0.151 |
| 10.765 | 7.582 | 0.151 |
| 11.474 | 9.688 | 0.151 |
| 12.164 | 11.720 | 0.151 |
| 12.827 | 13.670 | 0.151 |
| 13.455 | 15.529 | 0.151 |
| 14.038 | 17.292 | 0.151 |
| 14.578 | 18.949 | 0.151 |
| 15.074 | 20.492 | 0.151 |
| 15.524 | 21.916 | 0.151 |
| 15.929 | 23.215 | 0.151 |
| 16.288 | 24.387 | 0.151 |
| 16.602 | 25.428 | 0.151 |
| 16.874 | 26.338 | 0.151 |
| 17.104 | 27.119 | 0.151 |
| 17.294 | 27.773 | 0.151 |
| 17.447 | 28.306 | 0.151 |
| 17.567 | 28.723 | 0.151 |
| 17.654 | 29.036 | 0.151 |
| 17.647 | 29.259 | 0.151 |
| 17.564 | 29.374 | 0.151 |
| 17.472 | 29.433 | 0.151 |
| 17.398 | 29.454 | 0.151 |
| 17.298 | 29.454 | 0.151 |
| 17.157 | 29.384 | 0.151 |
| 17.035 | 29.192 | 0.151 |
| 16.899 | 28.918 | 0.151 |
| 16.726 | 28.568 | 0.151 |
| 16.511 | 28.139 | 0.151 |
| 16.249 | 27.630 | 0.151 |
| 15.937 | 27.039 | 0.151 |
| 15.571 | 26.366 | 0.151 |
| 15.149 | 25.614 | 0.151 |
| 14.668 | 24.785 | 0.151 |
| 14.123 | 23.886 | 0.151 |
| 13.512 | 22.922 | 0.151 |
| 12.835 | 21.899 | 0.151 |
| 12.092 | 20.823 | 0.151 |
| 11.282 | 19.704 | 0.151 |
| 10.406 | 18.549 | 0.151 |
| 9.465 | 17.366 | 0.151 |
| 8.463 | 16.165 | 0.151 |
| 7.404 | 14.955 | 0.151 |
| 6.293 | 13.742 | 0.151 |
| 5.135 | 12.534 | 0.151 |
| 3.938 | 11.340 | 0.151 |
| 2.711 | 10.164 | 0.151 |
| 1.460 | 9.014 | 0.151 |
| 0.193 | 7.895 | 0.151 |
| -1.080 | 6.814 | 0.151 |
| -2.353 | 5.775 | 0.151 |
| -3.617 | 4.787 | 0.151 |
| -4.868 | 3.855 | 0.151 |
| -6.098 | 2.986 | 0.151 |
| -7.299 | 2.184 | 0.151 |
| -8.465 | 1.455 | 0.151 |
| -9.576 | 0.782 | 0.151 |
| -10.622 | 0.158 | 0.151 |
| -11.586 | -0.433 | 0.151 |
| -12.457 | -1.002 | 0.151 |
| -13.216 | -1.565 | 0.151 |
| -13.860 | -2.117 | 0.151 |
| -14.385 | -2.653 | 0.151 |
| -14.779 | -3.171 | 0.151 |
| -15.050 | -3.655 | 0.151 |
| -15.228 | -4.078 | 0.151 |
| -15.336 | -4.430 | 0.151 |
| -15.401 | -4.704 | 0.151 |
| -15.435 | -4.903 | 0.151 |
| -15.453 | -5.033 | 0.151 |
| -15.655 | -5.494 | 0.210 |
| -15.667 | -5.623 | 0.210 |
| -15.678 | -5.812 | 0.210 |
| -15.679 | -6.103 | 0.210 |
| -15.646 | -6.507 | 0.210 |
| -15.547 | -7.028 | 0.210 |
| -15.355 | -7.661 | 0.210 |
| -15.063 | -8.404 | 0.210 |
| -14.657 | -9.251 | 0.210 |
| -14.119 | -10.188 | 0.210 |
| -13.427 | -11.195 | 0.210 |
| -12.562 | -12.246 | 0.210 |
| -11.500 | -13.303 | 0.210 |
| -10.217 | -14.306 | 0.210 |
| -8.692 | -15.168 | 0.210 |
| -6.928 | -15.786 | 0.210 |
| -4.967 | -16.030 | 0.210 |
| -2.913 | -15.742 | 0.210 |
| -0.911 | -14.922 | 0.210 |
| 0.919 | -13.623 | 0.210 |
| 2.513 | -11.950 | 0.210 |
| 3.890 | -10.029 | 0.210 |
| 5.086 | -7.941 | 0.210 |
| 6.121 | -5.738 | 0.210 |
| 7.034 | -3.467 | 0.210 |
| 7.862 | -1.163 | 0.210 |
| 8.630 | 1.149 | 0.210 |
| 9.353 | 3.448 | 0.210 |
| 10.054 | 5.711 | 0.210 |
| 10.739 | 7.926 | 0.210 |
| 11.408 | 10.077 | 0.210 |

TABLE 1-continued

| X | Y | Z' |
|---|---|---|
| 12.060 | 12.153 | 0.210 |
| 12.685 | 14.146 | 0.210 |
| 13.279 | 16.047 | 0.210 |
| 13.829 | 17.848 | 0.210 |
| 14.339 | 19.540 | 0.210 |
| 14.806 | 21.116 | 0.210 |
| 15.230 | 22.570 | 0.210 |
| 15.610 | 23.897 | 0.210 |
| 15.948 | 25.093 | 0.210 |
| 16.243 | 26.156 | 0.210 |
| 16.498 | 27.085 | 0.210 |
| 16.713 | 27.882 | 0.210 |
| 16.891 | 28.550 | 0.210 |
| 17.035 | 29.093 | 0.210 |
| 17.146 | 29.519 | 0.210 |
| 17.228 | 29.838 | 0.210 |
| 17.219 | 30.065 | 0.210 |
| 17.133 | 30.179 | 0.210 |
| 17.039 | 30.237 | 0.210 |
| 16.963 | 30.257 | 0.210 |
| 16.861 | 30.253 | 0.210 |
| 16.722 | 30.177 | 0.210 |
| 16.603 | 29.979 | 0.210 |
| 16.473 | 29.697 | 0.210 |
| 16.305 | 29.339 | 0.210 |
| 16.097 | 28.900 | 0.210 |
| 15.842 | 28.377 | 0.210 |
| 15.539 | 27.771 | 0.210 |
| 15.184 | 27.081 | 0.210 |
| 14.772 | 26.309 | 0.210 |
| 14.302 | 25.459 | 0.210 |
| 13.770 | 24.535 | 0.210 |
| 13.173 | 23.545 | 0.210 |
| 12.510 | 22.492 | 0.210 |
| 11.780 | 21.386 | 0.210 |
| 10.984 | 20.233 | 0.210 |
| 10.122 | 19.042 | 0.210 |
| 9.196 | 17.822 | 0.210 |
| 8.209 | 16.581 | 0.210 |
| 7.166 | 15.327 | 0.210 |
| 6.072 | 14.069 | 0.210 |
| 4.932 | 12.813 | 0.210 |
| 3.755 | 11.567 | 0.210 |
| 2.548 | 10.337 | 0.210 |
| 1.318 | 9.130 | 0.210 |
| 0.074 | 7.952 | 0.210 |
| −1.177 | 6.811 | 0.210 |
| −2.428 | 5.711 | 0.210 |
| −3.672 | 4.662 | 0.210 |
| −4.904 | 3.671 | 0.210 |
| −6.119 | 2.746 | 0.210 |
| −7.308 | 1.892 | 0.210 |
| −8.466 | 1.117 | 0.210 |
| −9.578 | 0.410 | 0.210 |
| −10.628 | −0.239 | 0.210 |
| −11.601 | −0.845 | 0.210 |
| −12.489 | −1.415 | 0.210 |
| −13.272 | −1.968 | 0.210 |
| −13.945 | −2.503 | 0.210 |
| −14.500 | −3.023 | 0.210 |
| −14.919 | −3.533 | 0.210 |
| −15.207 | −4.016 | 0.210 |
| −15.398 | −4.440 | 0.210 |
| −15.516 | −4.794 | 0.210 |
| −15.586 | −5.071 | 0.210 |
| −15.624 | −5.272 | 0.210 |
| −15.644 | −5.403 | 0.210 |
| −15.842 | −5.840 | 0.270 |
| −15.856 | −5.971 | 0.270 |
| −15.869 | −6.162 | 0.270 |
| −15.873 | −6.457 | 0.270 |
| −15.842 | −6.867 | 0.270 |
| −15.742 | −7.394 | 0.270 |
| −15.544 | −8.035 | 0.270 |
| −15.241 | −8.785 | 0.270 |
| −14.823 | −9.640 | 0.270 |
| −14.268 | −10.584 | 0.270 |
| −13.555 | −11.597 | 0.270 |
| −12.663 | −12.650 | 0.270 |
| −11.569 | −13.702 | 0.270 |
| −10.247 | −14.689 | 0.270 |
| −8.678 | −15.521 | 0.270 |
| −6.871 | −16.088 | 0.270 |
| −4.876 | −16.265 | 0.270 |
| −2.804 | −15.910 | 0.270 |
| −0.793 | −15.036 | 0.270 |
| 1.045 | −13.696 | 0.270 |
| 2.649 | −11.990 | 0.270 |
| 4.035 | −10.035 | 0.270 |
| 5.232 | −7.912 | 0.270 |
| 6.263 | −5.670 | 0.270 |
| 7.164 | −3.359 | 0.270 |
| 7.972 | −1.013 | 0.270 |
| 8.715 | 1.342 | 0.270 |
| 9.409 | 3.683 | 0.270 |
| 10.076 | 5.990 | 0.270 |
| 10.726 | 8.247 | 0.270 |
| 11.360 | 10.441 | 0.270 |
| 11.976 | 12.559 | 0.270 |
| 12.567 | 14.591 | 0.270 |
| 13.128 | 16.530 | 0.270 |
| 13.647 | 18.366 | 0.270 |
| 14.129 | 20.091 | 0.270 |
| 14.570 | 21.698 | 0.270 |
| 14.969 | 23.180 | 0.270 |
| 15.327 | 24.532 | 0.270 |
| 15.645 | 25.751 | 0.270 |
| 15.922 | 26.834 | 0.270 |
| 16.160 | 27.781 | 0.270 |
| 16.362 | 28.593 | 0.270 |
| 16.529 | 29.273 | 0.270 |
| 16.663 | 29.826 | 0.270 |
| 16.768 | 30.261 | 0.270 |
| 16.844 | 30.585 | 0.270 |
| 16.834 | 30.815 | 0.270 |
| 16.745 | 30.930 | 0.270 |
| 16.648 | 30.987 | 0.270 |
| 16.571 | 31.005 | 0.270 |
| 16.468 | 30.997 | 0.270 |
| 16.329 | 30.915 | 0.270 |
| 16.215 | 30.711 | 0.270 |
| 16.088 | 30.423 | 0.270 |
| 15.925 | 30.057 | 0.270 |
| 15.724 | 29.607 | 0.270 |
| 15.476 | 29.073 | 0.270 |
| 15.181 | 28.452 | 0.270 |
| 14.835 | 27.745 | 0.270 |
| 14.434 | 26.954 | 0.270 |
| 13.975 | 26.083 | 0.270 |
| 13.454 | 25.136 | 0.270 |
| 12.869 | 24.120 | 0.270 |
| 12.219 | 23.040 | 0.270 |
| 11.502 | 21.903 | 0.270 |
| 10.718 | 20.719 | 0.270 |
| 9.869 | 19.494 | 0.270 |
| 8.957 | 18.238 | 0.270 |
| 7.984 | 16.958 | 0.270 |
| 6.955 | 15.664 | 0.270 |
| 5.876 | 14.362 | 0.270 |
| 4.753 | 13.061 | 0.270 |
| 3.592 | 11.767 | 0.270 |
| 2.403 | 10.487 | 0.270 |
| 1.192 | 9.228 | 0.270 |
| −0.032 | 7.997 | 0.270 |
| −1.264 | 6.801 | 0.270 |
| −2.496 | 5.646 | 0.270 |
| −3.722 | 4.542 | 0.270 |
| −4.939 | 3.499 | 0.270 |
| −6.141 | 2.524 | 0.270 |
| −7.321 | 1.625 | 0.270 |
| −8.474 | 0.807 | 0.270 |
| −9.586 | 0.068 | 0.270 |
| −10.643 | −0.603 | 0.270 |
| −11.626 | −1.223 | 0.270 |
| −12.528 | −1.797 | 0.270 |
| −13.334 | −2.339 | 0.270 |

TABLE 1-continued

| X | Y | Z' |
|---|---|---|
| −14.033 | −2.861 | 0.270 |
| −14.615 | −3.366 | 0.270 |
| −15.057 | −3.869 | 0.270 |
| −15.361 | −4.350 | 0.270 |
| −15.565 | −4.776 | 0.270 |
| −15.691 | −5.132 | 0.270 |
| −15.767 | −5.412 | 0.270 |
| −15.808 | −5.615 | 0.270 |
| −15.830 | −5.748 | 0.270 |
| −16.025 | −6.160 | 0.329 |
| −16.040 | −6.292 | 0.329 |
| −16.055 | −6.486 | 0.329 |
| −16.061 | −6.784 | 0.329 |
| −16.032 | −7.200 | 0.329 |
| −15.931 | −7.734 | 0.329 |
| −15.726 | −8.381 | 0.329 |
| −15.414 | −9.139 | 0.329 |
| −14.983 | −10.001 | 0.329 |
| −14.412 | −10.952 | 0.329 |
| −13.679 | −11.969 | 0.329 |
| −12.762 | −13.023 | 0.329 |
| −11.637 | −14.070 | 0.329 |
| −10.278 | −15.042 | 0.329 |
| −8.667 | −15.842 | 0.329 |
| −6.822 | −16.363 | 0.329 |
| −4.797 | −16.476 | 0.329 |
| −2.708 | −16.060 | 0.329 |
| −0.689 | −15.137 | 0.329 |
| 1.157 | −13.759 | 0.329 |
| 2.772 | −12.023 | 0.329 |
| 4.166 | −10.037 | 0.329 |
| 5.368 | −7.880 | 0.329 |
| 6.396 | −5.604 | 0.329 |
| 7.288 | −3.255 | 0.329 |
| 8.081 | −0.871 | 0.329 |
| 8.803 | 1.522 | 0.329 |
| 9.472 | 3.903 | 0.329 |
| 10.109 | 6.250 | 0.329 |
| 10.728 | 8.547 | 0.329 |
| 11.330 | 10.779 | 0.329 |
| 11.914 | 12.935 | 0.329 |
| 12.474 | 15.004 | 0.329 |
| 13.004 | 16.977 | 0.329 |
| 13.494 | 18.847 | 0.329 |
| 13.949 | 20.603 | 0.329 |
| 14.365 | 22.238 | 0.329 |
| 14.741 | 23.746 | 0.329 |
| 15.079 | 25.121 | 0.329 |
| 15.377 | 26.361 | 0.329 |
| 15.638 | 27.463 | 0.329 |
| 15.862 | 28.426 | 0.329 |
| 16.051 | 29.252 | 0.329 |
| 16.208 | 29.943 | 0.329 |
| 16.333 | 30.506 | 0.329 |
| 16.431 | 30.948 | 0.329 |
| 16.503 | 31.278 | 0.329 |
| 16.491 | 31.510 | 0.329 |
| 16.399 | 31.626 | 0.329 |
| 16.300 | 31.682 | 0.329 |
| 16.222 | 31.698 | 0.329 |
| 16.118 | 31.688 | 0.329 |
| 15.980 | 31.600 | 0.329 |
| 15.869 | 31.390 | 0.329 |
| 15.746 | 31.096 | 0.329 |
| 15.588 | 30.722 | 0.329 |
| 15.392 | 30.262 | 0.329 |
| 15.151 | 29.716 | 0.329 |
| 14.864 | 29.081 | 0.329 |
| 14.526 | 28.358 | 0.329 |
| 14.135 | 27.550 | 0.329 |
| 13.685 | 26.659 | 0.329 |
| 13.175 | 25.690 | 0.329 |
| 12.602 | 24.649 | 0.329 |
| 11.963 | 23.542 | 0.329 |
| 11.258 | 22.377 | 0.329 |
| 10.487 | 21.161 | 0.329 |
| 9.649 | 19.904 | 0.329 |
| 8.749 | 18.614 | 0.329 |
| 7.789 | 17.297 | 0.329 |
| 6.773 | 15.964 | 0.329 |
| 5.708 | 14.622 | 0.329 |
| 4.599 | 13.279 | 0.329 |
| 3.454 | 11.941 | 0.329 |
| 2.280 | 10.615 | 0.329 |
| 1.085 | 9.309 | 0.329 |
| −0.123 | 8.029 | 0.329 |
| −1.339 | 6.784 | 0.329 |
| −2.555 | 5.580 | 0.329 |
| −3.767 | 4.428 | 0.329 |
| −4.971 | 3.338 | 0.329 |
| −6.164 | 2.319 | 0.329 |
| −7.338 | 1.379 | 0.329 |
| −8.487 | 0.524 | 0.329 |
| −9.600 | −0.246 | 0.329 |
| −10.663 | −0.937 | 0.329 |
| −11.660 | −1.566 | 0.329 |
| −12.576 | −2.145 | 0.329 |
| −13.402 | −2.680 | 0.329 |
| −14.124 | −3.191 | 0.329 |
| −14.730 | −3.683 | 0.329 |
| −15.194 | −4.178 | 0.329 |
| −15.513 | −4.659 | 0.329 |
| −15.729 | −5.086 | 0.329 |
| −15.862 | −5.445 | 0.329 |
| −15.943 | −5.727 | 0.329 |
| −15.988 | −5.933 | 0.329 |
| −16.011 | −6.067 | 0.329 |
| −16.203 | −6.454 | 0.388 |
| −16.219 | −6.588 | 0.388 |
| −16.236 | −6.784 | 0.388 |
| −16.243 | −7.086 | 0.388 |
| −16.216 | −7.506 | 0.388 |
| −16.113 | −8.047 | 0.388 |
| −15.902 | −8.700 | 0.388 |
| −15.581 | −9.465 | 0.388 |
| −15.139 | −10.333 | 0.388 |
| −14.553 | −11.290 | 0.388 |
| −13.800 | −12.312 | 0.388 |
| −12.859 | −13.366 | 0.388 |
| −11.704 | −14.407 | 0.388 |
| −10.310 | −15.363 | 0.388 |
| −8.661 | −16.134 | 0.388 |
| −6.781 | −16.609 | 0.388 |
| −4.729 | −16.663 | 0.388 |
| −2.626 | −16.193 | 0.388 |
| −0.599 | −15.225 | 0.388 |
| 1.255 | −13.813 | 0.388 |
| 2.881 | −12.048 | 0.388 |
| 4.285 | −10.035 | 0.388 |
| 5.492 | −7.848 | 0.388 |
| 6.520 | −5.539 | 0.388 |
| 7.407 | −3.157 | 0.388 |
| 8.188 | −0.738 | 0.388 |
| 8.893 | 1.691 | 0.388 |
| 9.541 | 4.107 | 0.388 |
| 10.153 | 6.491 | 0.388 |
| 10.745 | 8.823 | 0.388 |
| 11.318 | 11.091 | 0.388 |
| 11.873 | 13.282 | 0.388 |
| 12.404 | 15.385 | 0.388 |
| 12.905 | 17.390 | 0.388 |
| 13.369 | 19.290 | 0.388 |
| 13.799 | 21.074 | 0.388 |
| 14.192 | 22.735 | 0.388 |
| 14.547 | 24.267 | 0.388 |
| 14.865 | 25.664 | 0.388 |
| 15.147 | 26.923 | 0.388 |
| 15.392 | 28.042 | 0.388 |
| 15.602 | 29.020 | 0.388 |
| 15.780 | 29.858 | 0.388 |
| 15.927 | 30.561 | 0.388 |
| 16.045 | 31.132 | 0.388 |
| 16.136 | 31.580 | 0.388 |
| 16.204 | 31.915 | 0.388 |
| 16.190 | 32.151 | 0.388 |
| 16.097 | 32.267 | 0.388 |

TABLE 1-continued

| X | Y | Z' |
|---|---|---|
| 15.995 | 32.322 | 0.388 |
| 15.916 | 32.337 | 0.388 |
| 15.811 | 32.323 | 0.388 |
| 15.674 | 32.230 | 0.388 |
| 15.566 | 32.015 | 0.388 |
| 15.447 | 31.715 | 0.388 |
| 15.293 | 31.333 | 0.388 |
| 15.102 | 30.864 | 0.388 |
| 14.868 | 30.307 | 0.388 |
| 14.588 | 29.659 | 0.388 |
| 14.258 | 28.921 | 0.388 |
| 13.874 | 28.096 | 0.388 |
| 13.435 | 27.186 | 0.388 |
| 12.934 | 26.195 | 0.388 |
| 12.371 | 25.131 | 0.388 |
| 11.744 | 23.999 | 0.388 |
| 11.050 | 22.806 | 0.388 |
| 10.289 | 21.562 | 0.388 |
| 9.463 | 20.274 | 0.388 |
| 8.574 | 18.950 | 0.388 |
| 7.626 | 17.600 | 0.388 |
| 6.622 | 16.231 | 0.388 |
| 5.569 | 14.851 | 0.388 |
| 4.472 | 13.468 | 0.388 |
| 3.340 | 12.089 | 0.388 |
| 2.179 | 10.721 | 0.388 |
| 0.998 | 9.372 | 0.388 |
| −0.197 | 8.049 | 0.388 |
| −1.400 | 6.760 | 0.388 |
| −2.604 | 5.513 | 0.388 |
| −3.806 | 4.319 | 0.388 |
| −5.001 | 3.187 | 0.388 |
| −6.187 | 2.130 | 0.388 |
| −7.357 | 1.154 | 0.388 |
| −8.506 | 0.268 | 0.388 |
| −9.622 | −0.529 | 0.388 |
| −10.691 | −1.241 | 0.388 |
| −11.702 | −1.876 | 0.388 |
| −12.631 | −2.459 | 0.388 |
| −13.476 | −2.991 | 0.388 |
| −14.210 | −3.492 | 0.388 |
| −14.846 | −3.973 | 0.388 |
| −15.330 | −4.461 | 0.388 |
| −15.663 | −4.941 | 0.388 |
| −15.889 | −5.370 | 0.388 |
| −16.029 | −5.732 | 0.388 |
| −16.115 | −6.017 | 0.388 |
| −16.163 | −6.224 | 0.388 |
| −16.188 | −6.360 | 0.388 |
| −16.375 | −6.723 | 0.447 |
| −16.393 | −6.858 | 0.447 |
| −16.411 | −7.056 | 0.447 |
| −16.420 | −7.361 | 0.447 |
| −16.393 | −7.786 | 0.447 |
| −16.289 | −8.332 | 0.447 |
| −16.072 | −8.992 | 0.447 |
| −15.743 | −9.762 | 0.447 |
| −15.289 | −10.637 | 0.447 |
| −14.689 | −11.599 | 0.447 |
| −13.918 | −12.624 | 0.447 |
| −12.953 | −13.679 | 0.447 |
| −11.770 | −14.713 | 0.447 |
| −10.343 | −15.653 | 0.447 |
| −8.660 | −16.395 | 0.447 |
| −6.748 | −16.828 | 0.447 |
| −4.673 | −16.828 | 0.447 |
| −2.558 | −16.309 | 0.447 |
| −0.522 | −15.300 | 0.447 |
| 1.340 | −13.857 | 0.447 |
| 2.977 | −12.067 | 0.447 |
| 4.391 | −10.029 | 0.447 |
| 5.606 | −7.815 | 0.447 |
| 6.636 | −5.478 | 0.447 |
| 7.520 | −3.065 | 0.447 |
| 8.294 | −0.614 | 0.447 |
| 8.986 | 1.846 | 0.447 |
| 9.617 | 4.295 | 0.447 |
| 10.209 | 6.711 | 0.447 |
| 10.777 | 9.077 | 0.447 |
| 11.325 | 11.377 | 0.447 |
| 11.853 | 13.599 | 0.447 |
| 12.358 | 15.732 | 0.447 |
| 12.833 | 17.767 | 0.447 |
| 13.272 | 19.695 | 0.447 |
| 13.679 | 21.504 | 0.447 |
| 14.051 | 23.189 | 0.447 |
| 14.387 | 24.743 | 0.447 |
| 14.687 | 26.160 | 0.447 |
| 14.952 | 27.437 | 0.447 |
| 15.184 | 28.571 | 0.447 |
| 15.382 | 29.563 | 0.447 |
| 15.549 | 30.413 | 0.447 |
| 15.687 | 31.125 | 0.447 |
| 15.798 | 31.704 | 0.447 |
| 15.884 | 32.159 | 0.447 |
| 15.947 | 32.498 | 0.447 |
| 15.932 | 32.736 | 0.447 |
| 15.837 | 32.853 | 0.447 |
| 15.734 | 32.907 | 0.447 |
| 15.652 | 32.920 | 0.447 |
| 15.547 | 32.904 | 0.447 |
| 15.411 | 32.806 | 0.447 |
| 15.306 | 32.586 | 0.447 |
| 15.190 | 32.281 | 0.447 |
| 15.040 | 31.892 | 0.447 |
| 14.854 | 31.414 | 0.447 |
| 14.625 | 30.846 | 0.447 |
| 14.352 | 30.186 | 0.447 |
| 14.029 | 29.434 | 0.447 |
| 13.654 | 28.592 | 0.447 |
| 13.222 | 27.664 | 0.447 |
| 12.731 | 26.654 | 0.447 |
| 12.178 | 25.567 | 0.447 |
| 11.561 | 24.411 | 0.447 |
| 10.877 | 23.193 | 0.447 |
| 10.128 | 21.921 | 0.447 |
| 9.312 | 20.603 | 0.447 |
| 8.434 | 19.249 | 0.447 |
| 7.496 | 17.866 | 0.447 |
| 6.503 | 16.463 | 0.447 |
| 5.461 | 15.048 | 0.447 |
| 4.375 | 13.628 | 0.447 |
| 3.254 | 12.212 | 0.447 |
| 2.104 | 10.806 | 0.447 |
| 0.932 | 9.418 | 0.447 |
| −0.253 | 8.056 | 0.447 |
| −1.446 | 6.729 | 0.447 |
| −2.642 | 5.445 | 0.447 |
| −3.837 | 4.214 | 0.447 |
| −5.027 | 3.047 | 0.447 |
| −6.210 | 1.957 | 0.447 |
| −7.380 | 0.951 | 0.447 |
| −8.530 | 0.038 | 0.447 |
| −9.651 | −0.781 | 0.447 |
| −10.728 | −1.511 | 0.447 |
| −11.750 | −2.155 | 0.447 |
| −12.695 | −2.741 | 0.447 |
| −13.555 | −3.271 | 0.447 |
| −14.315 | −3.765 | 0.447 |
| −14.963 | −4.237 | 0.447 |
| −15.465 | −4.718 | 0.447 |
| −15.811 | −5.198 | 0.447 |
| −16.046 | −5.629 | 0.447 |
| −16.193 | −5.993 | 0.447 |
| −16.283 | −6.281 | 0.447 |
| −16.334 | −6.491 | 0.447 |
| −16.360 | −6.628 | 0.447 |
| −16.543 | −6.966 | 0.506 |
| −16.562 | −7.103 | 0.506 |
| −16.581 | −7.302 | 0.506 |
| −16.591 | −7.610 | 0.506 |
| −16.565 | −8.039 | 0.506 |
| −16.459 | −8.591 | 0.506 |
| −16.236 | −9.256 | 0.506 |
| −15.899 | −10.032 | 0.506 |
| −15.435 | −10.912 | 0.506 |

TABLE 1-continued

| X | Y | Z' |
|---|---|---|
| −14.821 | −11.878 | 0.506 |
| −14.033 | −12.906 | 0.506 |
| −13.046 | −13.959 | 0.506 |
| −11.837 | −14.987 | 0.506 |
| −10.379 | −15.911 | 0.506 |
| −8.664 | −16.625 | 0.506 |
| −6.720 | −17.019 | 0.506 |
| −4.622 | −16.968 | 0.506 |
| −2.492 | −16.403 | 0.506 |
| −0.448 | −15.354 | 0.506 |
| 1.422 | −13.881 | 0.506 |
| 3.068 | −12.067 | 0.506 |
| 4.492 | −10.004 | 0.506 |
| 5.714 | −7.767 | 0.506 |
| 6.749 | −5.404 | 0.506 |
| 7.632 | −2.966 | 0.506 |
| 8.401 | −0.488 | 0.506 |
| 9.085 | 2.000 | 0.506 |
| 9.702 | 4.477 | 0.506 |
| 10.277 | 6.920 | 0.506 |
| 10.826 | 9.314 | 0.506 |
| 11.352 | 11.642 | 0.506 |
| 11.857 | 13.891 | 0.506 |
| 12.338 | 16.051 | 0.506 |
| 12.788 | 18.112 | 0.506 |
| 13.204 | 20.063 | 0.506 |
| 13.589 | 21.895 | 0.506 |
| 13.942 | 23.601 | 0.506 |
| 14.260 | 25.173 | 0.506 |
| 14.544 | 26.608 | 0.506 |
| 14.794 | 27.900 | 0.506 |
| 15.013 | 29.048 | 0.506 |
| 15.199 | 30.051 | 0.506 |
| 15.357 | 30.911 | 0.506 |
| 15.487 | 31.632 | 0.506 |
| 15.591 | 32.218 | 0.506 |
| 15.672 | 32.678 | 0.506 |
| 15.730 | 33.022 | 0.506 |
| 15.717 | 33.264 | 0.506 |
| 15.620 | 33.384 | 0.506 |
| 15.515 | 33.437 | 0.506 |
| 15.432 | 33.449 | 0.506 |
| 15.325 | 33.431 | 0.506 |
| 15.190 | 33.324 | 0.506 |
| 15.088 | 33.099 | 0.506 |
| 14.974 | 32.789 | 0.506 |
| 14.828 | 32.393 | 0.506 |
| 14.647 | 31.907 | 0.506 |
| 14.423 | 31.330 | 0.506 |
| 14.155 | 30.658 | 0.506 |
| 13.839 | 29.893 | 0.506 |
| 13.471 | 29.036 | 0.506 |
| 13.048 | 28.091 | 0.506 |
| 12.565 | 27.062 | 0.506 |
| 12.022 | 25.955 | 0.506 |
| 11.414 | 24.776 | 0.506 |
| 10.740 | 23.533 | 0.506 |
| 10.001 | 22.236 | 0.506 |
| 9.195 | 20.891 | 0.506 |
| 8.327 | 19.508 | 0.506 |
| 7.399 | 18.094 | 0.506 |
| 6.416 | 16.660 | 0.506 |
| 5.383 | 15.212 | 0.506 |
| 4.307 | 13.759 | 0.506 |
| 3.194 | 12.309 | 0.506 |
| 2.053 | 10.869 | 0.506 |
| 0.889 | 9.448 | 0.506 |
| −0.289 | 8.052 | 0.506 |
| −1.477 | 6.691 | 0.506 |
| −2.668 | 5.375 | 0.506 |
| −3.860 | 4.113 | 0.506 |
| −5.049 | 2.918 | 0.506 |
| −6.232 | 1.801 | 0.506 |
| −7.404 | 0.769 | 0.506 |
| −8.560 | −0.166 | 0.506 |
| −9.687 | −1.003 | 0.506 |
| −10.772 | −1.749 | 0.506 |
| −11.806 | −2.402 | 0.506 |
| −12.764 | −2.990 | 0.506 |
| −13.638 | −3.520 | 0.506 |
| −14.415 | −4.007 | 0.506 |
| −15.079 | −4.473 | 0.506 |
| −15.598 | −4.949 | 0.506 |
| −15.957 | −5.430 | 0.506 |
| −16.201 | −5.862 | 0.506 |
| −16.353 | −6.229 | 0.506 |
| −16.447 | −6.519 | 0.506 |
| −16.499 | −6.731 | 0.506 |
| −16.527 | −6.870 | 0.506 |
| −16.706 | −7.184 | 0.566 |
| −16.725 | −7.322 | 0.566 |
| −16.745 | −7.522 | 0.566 |
| −16.756 | −7.834 | 0.566 |
| −16.730 | −8.267 | 0.566 |
| −16.622 | −8.823 | 0.566 |
| −16.394 | −9.492 | 0.566 |
| −16.050 | −10.274 | 0.566 |
| −15.576 | −11.159 | 0.566 |
| −14.949 | −12.129 | 0.566 |
| −14.144 | −13.159 | 0.566 |
| −13.137 | −14.211 | 0.566 |
| −11.903 | −15.231 | 0.566 |
| −10.417 | −16.139 | 0.566 |
| −8.674 | −16.825 | 0.566 |
| −6.709 | −17.183 | 0.566 |
| −4.597 | −17.089 | 0.566 |
| −2.460 | −16.488 | 0.566 |
| −0.410 | −15.412 | 0.566 |
| 1.469 | −13.917 | 0.566 |
| 3.128 | −12.086 | 0.566 |
| 4.565 | −10.005 | 0.566 |
| 5.799 | −7.748 | 0.566 |
| 6.842 | −5.363 | 0.566 |
| 7.730 | −2.901 | 0.566 |
| 8.500 | −0.398 | 0.566 |
| 9.179 | 2.117 | 0.566 |
| 9.789 | 4.620 | 0.566 |
| 10.353 | 7.091 | 0.566 |
| 10.886 | 9.512 | 0.566 |
| 11.395 | 11.867 | 0.566 |
| 11.880 | 14.143 | 0.566 |
| 12.340 | 16.329 | 0.566 |
| 12.768 | 18.414 | 0.566 |
| 13.164 | 20.389 | 0.566 |
| 13.530 | 22.243 | 0.566 |
| 13.865 | 23.969 | 0.566 |
| 14.167 | 25.560 | 0.566 |
| 14.436 | 27.011 | 0.566 |
| 14.674 | 28.319 | 0.566 |
| 14.880 | 29.480 | 0.566 |
| 15.057 | 30.495 | 0.566 |
| 15.206 | 31.365 | 0.566 |
| 15.329 | 32.094 | 0.566 |
| 15.427 | 32.687 | 0.566 |
| 15.504 | 33.152 | 0.566 |
| 15.560 | 33.499 | 0.566 |
| 15.543 | 33.742 | 0.566 |
| 15.445 | 33.860 | 0.566 |
| 15.339 | 33.912 | 0.566 |
| 15.255 | 33.923 | 0.566 |
| 15.148 | 33.903 | 0.566 |
| 15.015 | 33.795 | 0.566 |
| 14.916 | 33.566 | 0.566 |
| 14.804 | 33.251 | 0.566 |
| 14.661 | 32.849 | 0.566 |
| 14.484 | 32.356 | 0.566 |
| 14.265 | 31.769 | 0.566 |
| 14.003 | 31.086 | 0.566 |
| 13.693 | 30.309 | 0.566 |
| 13.332 | 29.438 | 0.566 |
| 12.916 | 28.476 | 0.566 |
| 12.441 | 27.429 | 0.566 |
| 11.906 | 26.303 | 0.566 |
| 11.308 | 25.102 | 0.566 |
| 10.643 | 23.837 | 0.566 |
| 9.913 | 22.514 | 0.566 |

TABLE 1-continued

| X | Y | Z' |
|---|---|---|
| 9.117 | 21.144 | 0.566 |
| 8.258 | 19.733 | 0.566 |
| 7.339 | 18.291 | 0.566 |
| 6.365 | 16.827 | 0.566 |
| 5.340 | 15.349 | 0.566 |
| 4.271 | 13.865 | 0.566 |
| 3.165 | 12.384 | 0.566 |
| 2.029 | 10.914 | 0.566 |
| 0.870 | 9.462 | 0.566 |
| −0.305 | 8.036 | 0.566 |
| −1.491 | 6.647 | 0.566 |
| −2.682 | 5.304 | 0.566 |
| −3.875 | 4.016 | 0.566 |
| −5.067 | 2.797 | 0.566 |
| −6.255 | 1.658 | 0.566 |
| −7.433 | 0.607 | 0.566 |
| −8.596 | −0.345 | 0.566 |
| −9.732 | −1.197 | 0.566 |
| −10.827 | −1.955 | 0.566 |
| −11.871 | −2.618 | 0.566 |
| −12.843 | −3.207 | 0.566 |
| −13.730 | −3.738 | 0.566 |
| −14.521 | −4.222 | 0.566 |
| −15.199 | −4.683 | 0.566 |
| −15.732 | −5.155 | 0.566 |
| −16.101 | −5.636 | 0.566 |
| −16.352 | −6.070 | 0.566 |
| −16.510 | −6.440 | 0.566 |
| −16.606 | −6.732 | 0.566 |
| −16.661 | −6.947 | 0.566 |
| −16.689 | −7.087 | 0.566 |
| −16.864 | −7.376 | 0.625 |
| −16.884 | −7.515 | 0.625 |
| −16.904 | −7.717 | 0.625 |
| −16.915 | −8.031 | 0.625 |
| −16.889 | −8.467 | 0.625 |
| −16.778 | −9.027 | 0.625 |
| −16.546 | −9.701 | 0.625 |
| −16.195 | −10.487 | 0.625 |
| −15.712 | −11.376 | 0.625 |
| −15.073 | −12.350 | 0.625 |
| −14.253 | −13.381 | 0.625 |
| −13.227 | −14.430 | 0.625 |
| −11.970 | −15.443 | 0.625 |
| −10.459 | −16.335 | 0.625 |
| −8.690 | −16.996 | 0.625 |
| −6.703 | −17.320 | 0.625 |
| −4.576 | −17.187 | 0.625 |
| −2.430 | −16.552 | 0.625 |
| −0.373 | −15.448 | 0.625 |
| 1.513 | −13.933 | 0.625 |
| 3.184 | −12.085 | 0.625 |
| 4.633 | −9.989 | 0.625 |
| 5.878 | −7.714 | 0.625 |
| 6.932 | −5.311 | 0.625 |
| 7.827 | −2.829 | 0.625 |
| 8.600 | −0.305 | 0.625 |
| 9.280 | 2.231 | 0.625 |
| 9.885 | 4.756 | 0.625 |
| 10.441 | 7.250 | 0.625 |
| 10.963 | 9.693 | 0.625 |
| 11.457 | 12.070 | 0.625 |
| 11.926 | 14.369 | 0.625 |
| 12.367 | 16.577 | 0.625 |
| 12.776 | 18.684 | 0.625 |
| 13.152 | 20.679 | 0.625 |
| 13.501 | 22.551 | 0.625 |
| 13.820 | 24.295 | 0.625 |
| 14.107 | 25.902 | 0.625 |
| 14.364 | 27.367 | 0.625 |
| 14.589 | 28.687 | 0.625 |
| 14.786 | 29.860 | 0.625 |
| 14.954 | 30.885 | 0.625 |
| 15.095 | 31.764 | 0.625 |
| 15.211 | 32.499 | 0.625 |
| 15.304 | 33.098 | 0.625 |
| 15.377 | 33.567 | 0.625 |
| 15.430 | 33.918 | 0.625 |

TABLE 1-continued

| X | Y | Z' |
|---|---|---|
| 15.413 | 34.163 | 0.625 |
| 15.314 | 34.281 | 6.625 |
| 15.206 | 34.333 | 0.625 |
| 15.121 | 34.343 | 0.625 |
| 15.013 | 34.321 | 0.625 |
| 14.881 | 34.209 | 0.625 |
| 14.785 | 33.976 | 0.625 |
| 14.675 | 33.656 | 0.625 |
| 14.535 | 33.248 | 0.625 |
| 14.362 | 32.748 | 0.625 |
| 14.147 | 32.152 | 0.625 |
| 13.890 | 31.460 | 0.625 |
| 13.586 | 30.671 | 0.625 |
| 13.231 | 29.786 | 0.625 |
| 12.822 | 28.810 | 0.625 |
| 12.355 | 27.747 | 0.625 |
| 11.828 | 26.602 | 0.625 |
| 11.237 | 25.382 | 0.625 |
| 10.582 | 24.095 | 0.625 |
| 9.861 | 22.750 | 0.625 |
| 9.074 | 21.355 | 0.625 |
| 8.224 | 19.919 | 0.625 |
| 7.313 | 18.451 | 0.625 |
| 6.346 | 16.960 | 0.625 |
| 5.328 | 15.454 | 0.625 |
| 4.265 | 13.943 | 0.625 |
| 3.164 | 12.434 | 0.625 |
| 2.031 | 10.937 | 0.625 |
| 0.874 | 9.459 | 0.625 |
| −0.301 | 8.009 | 0.625 |
| −1.489 | 6.596 | 0.625 |
| −2.684 | 5.231 | 0.625 |
| −3.882 | 3.923 | 0.625 |
| −5.081 | 2.686 | 0.625 |
| −6.277 | 1.531 | 0.625 |
| −7.465 | 0.466 | 0.625 |
| −8.637 | −0.500 | 0.625 |
| −9.784 | −1.363 | 0.625 |
| −10.889 | −2.130 | 0.625 |
| −11.943 | −2.800 | 0.625 |
| −12.928 | −3.392 | 0.625 |
| −13.027 | −3.923 | 0.625 |
| −14.630 | −4.407 | 0.625 |
| −15.319 | −4.866 | 0.625 |
| −15.864 | −5.335 | 0.625 |
| −16.243 | −5.816 | 0.625 |
| −16.501 | −6.252 | 0.625 |
| −16.662 | −6.625 | 0.625 |
| −16.762 | −6.920 | 0.625 |
| −16.818 | −7.136 | 0.625 |
| −16.847 | −7.278 | 0.625 |
| −17.017 | −7.543 | 0.684 |
| −17.038 | −7.682 | 0.684 |
| −17.058 | −7.886 | 0.684 |
| −17.069 | −8.202 | 0.684 |
| −17.042 | −8.641 | 0.684 |
| −16.929 | −9.205 | 0.684 |
| −16.693 | −9.883 | 0.684 |
| −16.335 | −10.673 | 0.684 |
| −15.844 | −11.565 | 0.684 |
| −15.194 | −12.542 | 0.684 |
| −14.359 | −13.573 | 0.684 |
| −13.316 | −14.619 | 0.684 |
| −12.038 | −15.623 | 0.684 |
| −10.504 | −16.500 | 0.684 |
| −8.712 | −17.137 | 0.684 |
| −6.706 | −17.430 | 0.684 |
| −4.566 | −17.263 | 0.684 |
| −2.412 | −16.599 | 0.684 |
| −0.349 | −15.472 | 0.684 |
| 1.545 | −13.939 | 0.684 |
| 3.226 | −12.077 | 0.684 |
| 4.688 | −9.968 | 0.684 |
| 5.947 | −7.680 | 0.684 |
| 7.013 | −5.263 | 0.684 |
| 7.919 | −2.765 | 0.684 |
| 8.699 | −0.224 | 0.684 |
| 9.383 | 2.330 | 0.684 |

TABLE 1-continued

| X | Y | Z' |
|---|---|---|
| 9.989 | 4.874 | 0.684 |
| 10.541 | 7.387 | 0.684 |
| 11.055 | 9.849 | 0.684 |
| 11.539 | 12.246 | 0.684 |
| 11.994 | 14.565 | 0.684 |
| 12.419 | 16.792 | 0.684 |
| 12.811 | 18.917 | 0.684 |
| 13.170 | 20.929 | 0.684 |
| 13.503 | 22.818 | 0.684 |
| 13.808 | 24.577 | 0.684 |
| 14.081 | 26.198 | 0.684 |
| 14.326 | 27.676 | 0.684 |
| 14.542 | 29.007 | 0.684 |
| 14.729 | 30.190 | 0.684 |
| 14.889 | 31.223 | 0.684 |
| 15.023 | 32.109 | 0.684 |
| 15.134 | 32.851 | 0.684 |
| 15.223 | 33.455 | 0.684 |
| 15.292 | 33.928 | 0.684 |
| 15.342 | 34.282 | 0.684 |
| 15.325 | 34.528 | 0.684 |
| 15.225 | 34.648 | 0.684 |
| 15.116 | 34.698 | 0.684 |
| 15.031 | 34.707 | 0.684 |
| 14.922 | 34.684 | 0.684 |
| 14.791 | 34.568 | 0.684 |
| 14.696 | 34.331 | 0.684 |
| 14.589 | 34.007 | 0.684 |
| 14.452 | 33.595 | 0.684 |
| 14.282 | 33.087 | 0.684 |
| 14.071 | 32.484 | 0.684 |
| 13.818 | 31.782 | 0.684 |
| 13.519 | 30.982 | 0.684 |
| 13.170 | 30.086 | 0.684 |
| 12.767 | 29.096 | 0.684 |
| 12.307 | 28.018 | 0.684 |
| 11.787 | 26.856 | 0.684 |
| 11.205 | 25.618 | 0.684 |
| 10.558 | 24.311 | 0.684 |
| 9.845 | 22.944 | 0.684 |
| 9.067 | 21.527 | 0.684 |
| 8.225 | 20.067 | 0.684 |
| 7.322 | 18.575 | 0.684 |
| 6.362 | 17.059 | 0.684 |
| 5.349 | 15.529 | 0.684 |
| 4.291 | 13.993 | 0.684 |
| 3.192 | 12.460 | 0.684 |
| 2.060 | 10.940 | 0.684 |
| 0.902 | 9.440 | 0.684 |
| −0.277 | 7.969 | 0.684 |
| −1.470 | 6.538 | 0.684 |
| −2.673 | 5.156 | 0.684 |
| −3.881 | 3.834 | 0.684 |
| −5.091 | 2.585 | 0.684 |
| −6.299 | 1.419 | 0.684 |
| −7.499 | 0.345 | 0.684 |
| −8.684 | −0.629 | 0.684 |
| −9.842 | −1.499 | 0.684 |
| −10.959 | −2.272 | 0.684 |
| −12.024 | −2.948 | 0.684 |
| −13.019 | −3.544 | 0.684 |
| −13.929 | −4.078 | 0.684 |
| −14.741 | −4.562 | 0.684 |
| −15.441 | −5.021 | 0.684 |
| −15.996 | −5.489 | 0.684 |
| −16.383 | −5.970 | 0.684 |
| −16.647 | −6.409 | 0.684 |
| −16.811 | −6.785 | 0.684 |
| −16.913 | −7.082 | 0.684 |
| −16.970 | −7.301 | 0.684 |
| −17.000 | −7.444 | 0.684 |
| −17.166 | −7.684 | 0.744 |
| −17.186 | −7.824 | 0.744 |
| −17.206 | −8.029 | 0.744 |
| −17.217 | −8.347 | 0.744 |
| −17.188 | −8.789 | 0.744 |
| −17.073 | −9.356 | 0.744 |
| −16.833 | −10.037 | 0.744 |
| −16.470 | −10.830 | 0.744 |
| −15.971 | −11.725 | 0.744 |
| −15.311 | −12.703 | 0.744 |
| −14.463 | −13.734 | 0.744 |
| −13.403 | −14.776 | 0.744 |
| −12.107 | −15.772 | 0.744 |
| −10.552 | −16.633 | 0.744 |
| −8.740 | −17.248 | 0.744 |
| −6.718 | −17.514 | 0.744 |
| −4.567 | −17.317 | 0.744 |
| −2.407 | −16.629 | 0.744 |
| −0.338 | −15.483 | 0.744 |
| 1.563 | −13.936 | 0.744 |
| 3.255 | −12.062 | 0.744 |
| 4.731 | −9.944 | 0.744 |
| 6.004 | −7.646 | 0.744 |
| 7.085 | −5.218 | 0.744 |
| 8.005 | −2.708 | 0.744 |
| 8.796 | −0.154 | 0.744 |
| 9.488 | 2.414 | 0.744 |
| 10.098 | 4.974 | 0.744 |
| 10.652 | 7.502 | 0.744 |
| 11.163 | 9.980 | 0.744 |
| 11.639 | 12.394 | 0.744 |
| 12.083 | 14.729 | 0.744 |
| 12.496 | 16.972 | 0.744 |
| 12.872 | 19.114 | 0.744 |
| 13.216 | 21.141 | 0.744 |
| 13.535 | 23.045 | 0.744 |
| 13.827 | 24.816 | 0.744 |
| 14.090 | 26.449 | 0.744 |
| 14.324 | 27.938 | 0.744 |
| 14.531 | 29.279 | 0.744 |
| 14.710 | 30.470 | 0.744 |
| 14.863 | 31.511 | 0.744 |
| 14.992 | 32.403 | 0.744 |
| 15.098 | 33.150 | 0.744 |
| 15.182 | 33.758 | 0.744 |
| 15.248 | 34.235 | 0.744 |
| 15.297 | 34.591 | 0.744 |
| 15.279 | 34.839 | 0.744 |
| 15.179 | 34.959 | 0.744 |
| 15.069 | 35.009 | 0.744 |
| 14.983 | 35.018 | 0.744 |
| 14.873 | 34.992 | 0.744 |
| 14.743 | 34.873 | 0.744 |
| 14.651 | 34.633 | 0.744 |
| 14.545 | 34.305 | 0.744 |
| 14.410 | 33.888 | 0.744 |
| 14.243 | 33.375 | 0.744 |
| 14.036 | 32.764 | 0.744 |
| 13.787 | 32.054 | 0.744 |
| 13.493 | 31.244 | 0.744 |
| 13.149 | 30.336 | 0.744 |
| 12.752 | 29.334 | 0.744 |
| 12.299 | 28.242 | 0.744 |
| 11.786 | 27.064 | 0.744 |
| 11.211 | 25.809 | 0.744 |
| 10.572 | 24.484 | 0.744 |
| 9.867 | 23.098 | 0.744 |
| 9.097 | 21.660 | 0.744 |
| 8.262 | 20.179 | 0.744 |
| 7.366 | 18.665 | 0.744 |
| 6.412 | 17.126 | 0.744 |
| 5.404 | 15.574 | 0.744 |
| 4.348 | 14.016 | 0.744 |
| 3.250 | 12.462 | 0.744 |
| 2.116 | 10.922 | 0.744 |
| 0.953 | 9.404 | 0.744 |
| −0.232 | 7.917 | 0.744 |
| −1.435 | 6.472 | 0.744 |
| −2.649 | 5.079 | 0.744 |
| −3.871 | 3.749 | 0.744 |
| −5.096 | 2.492 | 0.744 |
| −6.321 | 1.321 | 0.744 |
| −7.536 | 0.243 | 0.744 |
| −8.736 | −0.733 | 0.744 |
| −9.908 | −1.607 | 0.744 |

TABLE 1-continued

| X | Y | Z' |
|---|---|---|
| −11.037 | −2.383 | 0.744 |
| −12.113 | −3.063 | 0.744 |
| −13.118 | −3.663 | 0.744 |
| −14.036 | −4.200 | 0.744 |
| −14.857 | −4.688 | 0.744 |
| −15.564 | −5.149 | 0.744 |
| −16.128 | −5.617 | 0.744 |
| −16.522 | −6.100 | 0.744 |
| −16.790 | −6.541 | 0.744 |
| −16.957 | −6.920 | 0.744 |
| −17.060 | −7.219 | 0.744 |
| −17.118 | −7.439 | 0.744 |
| −17.148 | −7.584 | 0.744 |
| −17.309 | −7.799 | 0.803 |
| −17.330 | −7.940 | 0.803 |
| −17.349 | −8.146 | 0.803 |
| −17.359 | −8.466 | 0.803 |
| −17.329 | −8.910 | 0.803 |
| −17.211 | −9.479 | 0.803 |
| −16.967 | −10.163 | 0.803 |
| −16.600 | −10.959 | 0.803 |
| −16.094 | −11.856 | 0.803 |
| −15.424 | −12.835 | 0.803 |
| −14.565 | −13.865 | 0.803 |
| −13.490 | −14.903 | 0.803 |
| −12.177 | −15.890 | 0.803 |
| −10.603 | −16.736 | 0.803 |
| −8.774 | −17.331 | 0.803 |
| −6.738 | −17.572 | 0.803 |
| −4.579 | −17.350 | 0.803 |
| −2.413 | −16.641 | 0.803 |
| −0.339 | −15.480 | 0.803 |
| 1.569 | −13.921 | 0.803 |
| 3.271 | −12.040 | 0.803 |
| 4.761 | −9.915 | 0.803 |
| 6.051 | −7.611 | 0.803 |
| 7.149 | −5.176 | 0.803 |
| 8.085 | −2.658 | 0.803 |
| 8.892 | −0.094 | 0.803 |
| 9.596 | 2.485 | 0.803 |
| 10.215 | 5.056 | 0.803 |
| 10.774 | 7.597 | 0.803 |
| 11.286 | 10.088 | 0.803 |
| 11.759 | 12.515 | 0.803 |
| 12.196 | 14.864 | 0.803 |
| 12.597 | 17.121 | 0.803 |
| 12.960 | 19.276 | 0.803 |
| 13.291 | 21.316 | 0.803 |
| 13.598 | 23.232 | 0.803 |
| 13.879 | 25.014 | 0.803 |
| 14.132 | 26.657 | 0.803 |
| 14.358 | 28.155 | 0.803 |
| 14.556 | 29.504 | 0.803 |
| 14.729 | 30.703 | 0.803 |
| 14.876 | 31.750 | 0.803 |
| 14.999 | 32.647 | 0.803 |
| 15.101 | 33.399 | 0.803 |
| 15.182 | 34.010 | 0.803 |
| 15.245 | 34.490 | 0.803 |
| 15.291 | 34.848 | 0.803 |
| 15.274 | 35.098 | 0.803 |
| 15.173 | 35.219 | 0.803 |
| 15.062 | 35.268 | 0.803 |
| 14.975 | 35.276 | 0.803 |
| 14.865 | 35.249 | 0.803 |
| 14.737 | 35.126 | 0.803 |
| 14.647 | 34.883 | 0.803 |
| 14.543 | 34.552 | 0.803 |
| 14.410 | 34.130 | 0.803 |
| 14.246 | 33.611 | 0.803 |
| 14.042 | 32.994 | 0.803 |
| 13.797 | 32.276 | 0.803 |
| 13.507 | 31.457 | 0.803 |
| 13.169 | 30.539 | 0.803 |
| 12.777 | 29.525 | 0.803 |
| 12.330 | 28.420 | 0.803 |
| 11.824 | 27.228 | 0.803 |
| 11.256 | 25.958 | 0.803 |
| 10.624 | 24.616 | 0.803 |
| 9.927 | 23.212 | 0.803 |
| 9.164 | 21.755 | 0.803 |
| 8.336 | 20.254 | 0.803 |
| 7.446 | 18.719 | 0.803 |
| 6.496 | 17.161 | 0.803 |
| 5.491 | 15.589 | 0.803 |
| 4.436 | 14.012 | 0.803 |
| 3.337 | 12.440 | 0.803 |
| 2.199 | 10.883 | 0.803 |
| 1.029 | 9.351 | 0.803 |
| −0.168 | 7.854 | 0.803 |
| −1.384 | 6.400 | 0.803 |
| −2.614 | 5.001 | 0.803 |
| −3.853 | 3.666 | 0.803 |
| −5.098 | 2.409 | 0.803 |
| −6.342 | 1.239 | 0.803 |
| −7.576 | 0.162 | 0.803 |
| −8.794 | −0.813 | 0.803 |
| −9.981 | −1.686 | 0.803 |
| −11.123 | −2.463 | 0.803 |
| −12.210 | −3.145 | 0.803 |
| −13.223 | −3.749 | 0.803 |
| −14.149 | −4.291 | 0.803 |
| −14.975 | −4.784 | 0.803 |
| −15.688 | −5.249 | 0.803 |
| −16.258 | −5.719 | 0.803 |
| −16.658 | −6.203 | 0.803 |
| −16.930 | −6.647 | 0.803 |
| −17.099 | −7.029 | 0.803 |
| −17.203 | −7.331 | 0.803 |
| −17.261 | −7.553 | 0.803 |
| −17.292 | −7.698 | 0.803 |
| −17.448 | −7.889 | 0.862 |
| −17.468 | −8.031 | 0.862 |
| −17.487 | −8.238 | 0.862 |
| −17.496 | −8.559 | 0.862 |
| −17.463 | −9.005 | 0.862 |
| −17.342 | −9.576 | 0.862 |
| −17.095 | −10.262 | 0.862 |
| −16.724 | −11.061 | 0.862 |
| −16.211 | −11.960 | 0.862 |
| −15.533 | −12.940 | 0.862 |
| −14.662 | −13.968 | 0.862 |
| −13.574 | −15.001 | 0.862 |
| −12.244 | −15.979 | 0.862 |
| −10.653 | −16.811 | 0.862 |
| −8.808 | −17.385 | 0.862 |
| −6.760 | −17.603 | 0.862 |
| −4.593 | −17.359 | 0.862 |
| −2.422 | −16.633 | 0.862 |
| −0.343 | −15.458 | 0.862 |
| 1.572 | −13.889 | 0.862 |
| 3.283 | −12.000 | 0.862 |
| 4.788 | −9.871 | 0.862 |
| 6.094 | −7.562 | 0.862 |
| 7.211 | −5.122 | 0.862 |
| 8.166 | −2.597 | 0.862 |
| 8.991 | −0.026 | 0.862 |
| 9.711 | 2.561 | 0.862 |
| 10.343 | 5.142 | 0.862 |
| 10.910 | 7.693 | 0.862 |
| 11.426 | 10.196 | 0.862 |
| 11.898 | 12.635 | 0.862 |
| 12.329 | 14.996 | 0.862 |
| 12.721 | 17.265 | 0.862 |
| 13.071 | 19.432 | 0.862 |
| 13.388 | 21.485 | 0.862 |
| 13.682 | 23.411 | 0.862 |
| 13.951 | 25.204 | 0.862 |
| 14.193 | 26.856 | 0.862 |
| 14.408 | 28.363 | 0.862 |
| 14.598 | 29.720 | 0.862 |
| 14.762 | 30.925 | 0.862 |
| 14.902 | 31.978 | 0.862 |
| 15.019 | 32.881 | 0.862 |
| 15.115 | 33.637 | 0.862 |
| 15.191 | 34.251 | 0.862 |

TABLE 1-continued

| X | Y | Z' |
|---|---|---|
| 15.251 | 34.734 | 0.862 |
| 15.295 | 35.094 | 0.862 |
| 15.277 | 35.345 | 0.862 |
| 15.177 | 35.467 | 0.862 |
| 15.065 | 35.515 | 0.862 |
| 14.977 | 35.522 | 0.862 |
| 14.866 | 35.494 | 0.862 |
| 14.740 | 35.367 | 0.862 |
| 14.653 | 35.121 | 0.862 |
| 14.551 | 34.786 | 0.862 |
| 14.422 | 34.360 | 0.862 |
| 14.261 | 33.835 | 0.862 |
| 14.062 | 33.211 | 0.862 |
| 13.823 | 32.485 | 0.862 |
| 13.539 | 31.656 | 0.862 |
| 13.208 | 30.728 | 0.862 |
| 12.824 | 29.702 | 0.862 |
| 12.385 | 28.583 | 0.862 |
| 11.888 | 27.376 | 0.862 |
| 11.330 | 26.090 | 0.862 |
| 10.708 | 24.731 | 0.862 |
| 10.021 | 23.308 | 0.862 |
| 9.267 | 21.831 | 0.862 |
| 8.448 | 20.311 | 0.862 |
| 7.565 | 18.756 | 0.862 |
| 6.620 | 17.178 | 0.862 |
| 5.618 | 15.586 | 0.862 |
| 4.562 | 13.992 | 0.862 |
| 3.460 | 12.404 | 0.862 |
| 2.315 | 10.834 | 0.862 |
| 1.134 | 9.291 | 0.862 |
| −0.076 | 7.785 | 0.862 |
| −1.310 | 6.327 | 0.862 |
| −2.561 | 4.926 | 0.862 |
| −3.823 | 3.593 | 0.862 |
| −5.091 | 2.340 | 0.862 |
| −6.358 | 1.175 | 0.862 |
| −7.615 | 0.105 | 0.862 |
| −8.853 | −0.864 | 0.862 |
| −10.058 | −1.733 | 0.862 |
| −11.214 | −2.508 | 0.862 |
| −12.312 | −3.191 | 0.862 |
| −13.333 | −3.801 | 0.862 |
| −14.265 | −4.349 | 0.862 |
| −15.096 | −4.850 | 0.862 |
| −15.812 | −5.321 | 0.862 |
| −16.388 | −5.794 | 0.862 |
| −16.793 | −6.280 | 0.862 |
| −17.067 | −6.728 | 0.862 |
| −17.237 | −7.112 | 0.862 |
| −17.342 | −7.417 | 0.862 |
| −17.400 | −7.641 | 0.862 |
| −17.430 | −7.787 | 0.862 |
| −17.678 | −7.994 | 0.964 |
| −17.697 | −8.137 | 0.964 |
| −17.715 | −8.346 | 0.964 |
| −17.721 | −8.670 | 0.964 |
| −17.684 | −9.119 | 0.964 |
| −17.556 | −9.694 | 0.964 |
| −17.305 | −10.384 | 0.964 |
| −16.926 | −11.187 | 0.964 |
| −16.404 | −12.090 | 0.964 |
| −15.711 | −13.071 | 0.964 |
| −14.823 | −14.097 | 0.964 |
| −13.712 | −15.124 | 0.964 |
| −12.356 | −16.088 | 0.964 |
| −10.738 | −16.897 | 0.964 |
| −0.869 | −17.443 | 0.964 |
| −6.801 | −17.628 | 0.964 |
| −4.621 | −17.352 | 0.964 |
| −2.439 | −16.600 | 0.964 |
| −0.350 | −15.405 | 0.964 |
| 1.576 | −13.818 | 0.964 |
| 3.305 | −11.919 | 0.964 |
| 4.833 | −9.781 | 0.964 |
| 6.169 | −7.465 | 0.964 |
| 7.320 | −5.018 | 0.964 |
| 8.309 | −2.483 | 0.964 |

TABLE 1-continued

| X | Y | Z' |
|---|---|---|
| 9.165 | 0.099 | 0.964 |
| 9.913 | 2.701 | 0.964 |
| 10.568 | 5.297 | 0.964 |
| 11.150 | 7.865 | 0.964 |
| 11.673 | 10.387 | 0.964 |
| 12.142 | 12.847 | 0.964 |
| 12.563 | 15.228 | 0.964 |
| 12.937 | 17.519 | 0.964 |
| 13.265 | 19.707 | 0.964 |
| 13.558 | 21.779 | 0.964 |
| 13.829 | 23.725 | 0.964 |
| 14.077 | 25.535 | 0.964 |
| 14.299 | 27.203 | 0.964 |
| 14.497 | 28.724 | 0.964 |
| 14.670 | 30.094 | 0.964 |
| 14.819 | 31.311 | 0.964 |
| 14.946 | 32.374 | 0.964 |
| 15.053 | 33.285 | 0.964 |
| 15.139 | 34.048 | 0.964 |
| 15.208 | 34.669 | 0.964 |
| 15.262 | 35.155 | 0.964 |
| 15.301 | 35.519 | 0.964 |
| 15.283 | 35.772 | 0.964 |
| 15.183 | 35.896 | 0.964 |
| 15.069 | 35.942 | 0.964 |
| 14.980 | 35.948 | 0.964 |
| 14.869 | 35.918 | 0.964 |
| 14.746 | 35.784 | 0.964 |
| 14.664 | 35.532 | 0.964 |
| 14.566 | 35.192 | 0.964 |
| 14.442 | 34.757 | 0.964 |
| 14.289 | 34.223 | 0.964 |
| 14.098 | 33.588 | 0.964 |
| 13.868 | 32.848 | 0.964 |
| 13.596 | 32.004 | 0.964 |
| 13.277 | 31.057 | 0.964 |
| 12.907 | 30.011 | 0.964 |
| 12.483 | 28.869 | 0.964 |
| 12.003 | 27.638 | 0.964 |
| 11.462 | 26.324 | 0.964 |
| 10.859 | 24.935 | 0.964 |
| 10.190 | 23.480 | 0.964 |
| 9.456 | 21.970 | 0.964 |
| 8.654 | 20.415 | 0.964 |
| 7.786 | 18.825 | 0.964 |
| 6.853 | 17.212 | 0.964 |
| 5.858 | 15.587 | 0.964 |
| 4.806 | 13.960 | 0.964 |
| 3.700 | 12.344 | 0.964 |
| 2.545 | 10.750 | 0.964 |
| 1.346 | 9.188 | 0.964 |
| 0.111 | 7.670 | 0.964 |
| −1.155 | 6.206 | 0.964 |
| −2.443 | 4.807 | 0.964 |
| −3.748 | 3.482 | 0.964 |
| −5.062 | 2.242 | 0.964 |
| −6.375 | 1.095 | 0.964 |
| −7.676 | 0.044 | 0.964 |
| −8.954 | −0.907 | 0.964 |
| −10.192 | −1.761 | 0.964 |
| −11.376 | −2.528 | 0.964 |
| −12.495 | −3.209 | 0.964 |
| −13.529 | −3.828 | 0.964 |
| −14.469 | −4.389 | 0.964 |
| −15.305 | −4.906 | 0.964 |
| −16.025 | −5.392 | 0.964 |
| −16.607 | −5.872 | 0.964 |
| −17.021 | −6.362 | 0.964 |
| −17.297 | −6.816 | 0.964 |
| −17.469 | −7.206 | 0.964 |
| −17.573 | −7.515 | 0.964 |
| −17.631 | −7.742 | 0.964 |
| −17.661 | −7.891 | 0.964 |
| −17.758 | −8.028 | 1.000 |
| −17.776 | −8.172 | 1.000 |
| −17.794 | −8.381 | 1.000 |
| −17.799 | −8.706 | 1.000 |
| −17.760 | −9.156 | 1.000 |

TABLE 1-continued

| X | Y | Z' |
|---|---|---|
| −17.630 | −9.732 | 1.000 |
| −17.377 | −10.424 | 1.000 |
| −16.997 | −11.228 | 1.000 |
| −16.471 | −12.133 | 1.000 |
| −15.774 | −13.114 | 1.000 |
| −14.879 | −14.140 | 1.000 |
| −13.760 | −15.165 | 1.000 |
| −12.396 | −16.125 | 1.000 |
| −10.769 | −16.927 | 1.000 |
| −8.891 | −17.462 | 1.000 |
| −6.817 | −17.636 | 1.000 |
| −4.631 | −17.350 | 1.000 |
| −2.446 | −16.589 | 1.000 |
| −0.353 | −15.387 | 1.000 |
| 1.577 | −13.795 | 1.000 |
| 3.312 | −11.891 | 1.000 |
| 4.849 | −9.751 | 1.000 |
| 6.195 | −7.432 | 1.000 |
| 7.357 | −4.982 | 1.000 |
| 8.358 | −2.444 | 1.000 |
| 9.226 | 0.142 | 1.000 |
| 9.984 | 2.749 | 1.000 |
| 10.646 | 5.351 | 1.000 |
| 11.234 | 7.925 | 1.000 |
| 11.759 | 10.454 | 1.000 |
| 12.228 | 12.920 | 1.000 |
| 12.645 | 15.309 | 1.000 |
| 13.013 | 17.608 | 1.000 |
| 13.332 | 19.803 | 1.000 |
| 13.617 | 21.882 | 1.000 |
| 13.880 | 23.834 | 1.000 |
| 14.121 | 25.650 | 1.000 |
| 14.336 | 27.324 | 1.000 |
| 14.527 | 28.850 | 1.000 |
| 14.695 | 30.224 | 1.000 |
| 14.839 | 31.445 | 1.000 |
| 14.962 | 32.512 | 1.000 |
| 15.064 | 33.426 | 1.000 |
| 15.148 | 34.191 | 1.000 |
| 15.214 | 34.814 | 1.000 |
| 15.266 | 35.302 | 1.000 |
| 15.303 | 35.667 | 1.000 |
| 15.285 | 35.921 | 1.000 |
| 15.185 | 36.045 | 1.000 |
| 15.071 | 36.092 | 1.000 |
| 14.982 | 36.097 | 1.000 |
| 14.870 | 36.066 | 1.000 |
| 14.749 | 35.929 | 1.000 |
| 14.667 | 35.676 | 1.000 |
| 14.572 | 35.334 | 1.000 |
| 14.449 | 34.896 | 1.000 |
| 14.298 | 34.359 | 1.000 |
| 14.111 | 33.719 | 1.000 |
| 13.884 | 32.975 | 1.000 |
| 13.616 | 32.125 | 1.000 |
| 13.301 | 31.172 | 1.000 |
| 12.936 | 30.119 | 1.000 |
| 12.518 | 28.970 | 1.000 |
| 12.043 | 27.729 | 1.000 |
| 11.508 | 26.406 | 1.000 |
| 10.911 | 25.007 | 1.000 |
| 10.250 | 23.541 | 1.000 |
| 9.522 | 22.020 | 1.000 |
| 8.726 | 20.452 | 1.000 |
| 7.863 | 18.850 | 1.000 |
| 6.934 | 17.225 | 1.000 |
| 5.943 | 15.588 | 1.000 |
| 4.891 | 13.950 | 1.000 |
| 3.784 | 12.324 | 1.000 |
| 2.626 | 10.721 | 1.000 |
| 1.421 | 9.153 | 1.000 |
| 0.177 | 7.631 | 1.000 |
| −1.100 | 6.165 | 1.000 |
| −2.401 | 4.766 | 1.000 |
| −3.721 | 3.444 | 1.000 |
| −5.051 | 2.209 | 1.000 |
| −6.380 | 1.068 | 1.000 |
| −7.696 | 0.024 | 1.000 |
| −8.987 | −0.920 | 1.000 |
| −10.238 | −1.769 | 1.000 |
| −11.432 | −2.532 | 1.000 |
| −12.558 | −3.213 | 1.000 |
| −13.596 | −3.835 | 1.000 |
| −14.541 | −4.399 | 1.000 |
| −15.378 | −4.923 | 1.000 |
| −16.099 | −5.414 | 1.000 |
| −16.684 | −5.896 | 1.000 |
| −17.100 | −6.388 | 1.000 |
| −17.377 | −6.844 | 1.000 |
| −17.549 | −7.236 | 1.000 |
| −17.654 | −7.547 | 1.000 |
| −17.711 | −7.775 | 1.000 |
| −17.741 | −7.925 | 1.000 |

In the above table, the plane Z'=0 corresponds to a reference plane P0 located at the base of the airfoil, that is to say level with the inner platform 12 of the blade 10.

As indicated at the beginning of the present description, the aerodynamic airfoil according to the invention is substantially identical to the nominal airfoil defined in the above table, that is to say that it varies very slightly from this nominal airfoil, being in particular defined with a ±1 mm envelope in a direction normal to the surface of the nominal airfoil and/or having X, Y coordinates lying within the ±5% range with respect to the X,Y coordinates of the nominal airfoil.

The coordinates of the above table are given starting from a value Z'=0 in the reference plane P0. The Z' coordinate is dimensionless, that is to say that for a point P1, located at a distance D from the plane P0 (D is therefore measured along the Z axis), the value of Z' is D/H where H represents the total height of the airfoil measured from the plane P0 to the tip of the airfoil. Of course, the complete coordinates of the blade are obtained by multiplying, in the above table, the Z' coordinate by the height H.

In the above table, the airfoil is characterized by 17 sections at constant Z' coordinate, for which the X and Y coordinates are specified. In each plane of section at constant coordinate Z', the cross section of the airfoil is given by a smooth continuous curve that joins each point (X,Y). Between each plane of section the airfoil is interpolated so as to generate a homogeneous airfoil.

A turbine blade, in particular for a fixed distributor of a turbine, having an aerodynamic airfoil as defined above with reference to Table 1, makes it possible to optimize the airflow close to the airfoil and the deviation of the flow of air over the moving wheel that drives the shaft of the turbomachine.

The invention also relates to a turbine that includes a ring of fixed guide blades comprising between 32 and 40 blades, each having an aerodynamic airfoil as described above.

Figure 2:
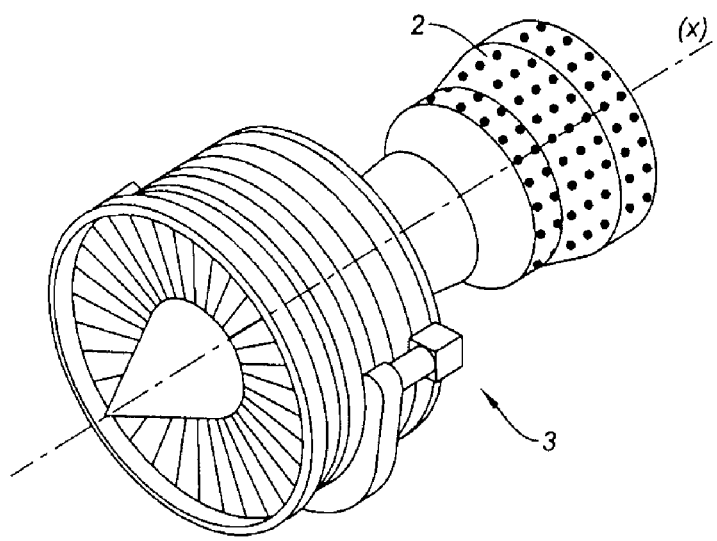
FIG. 2 is a perspective view of a turbomachine.

The invention also relates to a turbomachine 3, as shown in FIG. 2, equipped with a turbine 2 that includes blades having aerodynamic airfoils according to the invention.

What is claimed is:

1. An aerodynamic airfoil for a turbine blade, which, when cold and in the uncoated state, is substantially identical to a nominal airfoil determined by the Cartesian coordinates X, Y, Z' given in Table 1, in which the coordinate Z' is the ratio D/H where D is the distance from the point in question to a reference plane P0, located at the base of the nominal airfoil, and H is the height of this airfoil, measured from said reference plane up to the tip of the blade, the D and H measurements being taken radially with respect to the axis of the turbine whereas the X coordinate is measured in the axial direction of the turbine.

2. The aerodynamic airfoil as claimed in claim 1, which is defined within an envelope of ±1 mm in a direction normal to the surface of the nominal airfoil.

3. The aerodynamic airfoil as claimed in claim 1 or 2, wherein the X, Y coordinates of said airfoil lie within the ±5% range with respect to the X, Y coordinates of the nominal airfoil.

4. A turbine blade, which has an aerodynamic airfoil as claimed in claim 1.

5. A turbine, which includes turbine blades having aerodynamic airfoils as claimed in claim 1.

6. The turbine as claimed in claim 5, which includes a ring of fixed guide blades having between 32 and 40 blades, each having an aerodynamic airfoil as claimed in claim 1.

7. A turbomachine equipped with a turbine that includes blades having aerodynamic airfoils as claimed in claim 1.

* * * * *